United States Patent
Adar et al.

(10) Patent No.: US 8,589,922 B2
(45) Date of Patent: Nov. 19, 2013

(54) PERFORMANCE MONITOR DESIGN FOR COUNTING EVENTS GENERATED BY THREAD GROUPS

(75) Inventors: Etai Adar, Yokneam Ilit (IL);
Srinivasan Ramani, Cary, NC (US);
Eric F. Robinson, Raleigh, NC (US);
Thuong Q. Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/900,992

(22) Filed: Oct. 8, 2010

(65) Prior Publication Data
US 2012/0089979 A1    Apr. 12, 2012

(51) Int. Cl.
*G06F 9/455* (2006.01)
(52) U.S. Cl.
USPC .......................................................... 718/1
(58) Field of Classification Search
None
See application file for complete search history.

(56) References Cited

U.S. PATENT DOCUMENTS

| | | | |
|---|---|---|---|
| 6,574,727 B1 | 6/2003 | Davidson et al. | |
| 6,748,522 B1 | 6/2004 | Gregoire et al. | |
| 7,200,522 B2 | 4/2007 | Mericas | |
| 7,433,803 B2 | 10/2008 | Circello et al. | |
| 7,461,383 B2 | 12/2008 | Gara et al. | |
| 7,548,832 B2 | 6/2009 | Mericas | |
| 7,657,890 B2 | 2/2010 | Kanai et al. | |
| 7,676,655 B2 | 3/2010 | Jordan | |
| 7,702,887 B1 | 4/2010 | Grohoski et al. | |
| 7,987,345 B2 | 7/2011 | Silyaev et al. | |
| 2002/0144003 A1 | 10/2002 | Jin | |
| 2004/0168098 A1 | 8/2004 | Matsuoka | |
| 2005/0183065 A1 | 8/2005 | Wolczko et al. | |
| 2006/0235648 A1 | 10/2006 | Zheltov et al. | |
| 2007/0143582 A1 | 6/2007 | Coon et al. | |
| 2007/0150867 A1 | 6/2007 | Barsness et al. | |
| 2007/0168985 A1 | 7/2007 | Konishi et al. | |
| 2008/0195851 A1 | 8/2008 | Hoogerbrugge | |
| 2008/0294881 A1 | 11/2008 | Chen et al. | |
| 2009/0089014 A1 | 4/2009 | Silyaev et al. | |
| 2010/0042997 A1 | 2/2010 | Lev | |
| 2010/0095300 A1 | 4/2010 | West et al. | |
| 2010/0158005 A1 | 6/2010 | Mukhopadhyay et al. | |
| 2012/0089984 A1 | 4/2012 | Adar | |
| 2012/0089985 A1 | 4/2012 | Adar | |

FOREIGN PATENT DOCUMENTS

| | | |
|---|---|---|
| CN | 101571843 | 11/2009 |
| DE | 3928303 A1 | 2/1991 |
| EP | 750255 A2 | 12/1996 |
| EP | 0969379 A2 | 1/2000 |
| EP | 1321856 A2 | 6/2003 |
| WO | 2006079940 | 3/2006 |

OTHER PUBLICATIONS

U.S. Appl. No. 12/902,941, filed Oct. 12, 2010, Adar et al.
U.S. Appl. No. 12/900,667, filed Oct. 8, 2010, Adar et al.

(Continued)

*Primary Examiner* — Gregory A Kessler
(74) *Attorney, Agent, or Firm* — Yee & Associates, P.C.; Daniel H. Schnurmann (57) ABSTRACT

A number of hypervisor register fields are set to specify which processor cores are allowed to generate a number of performance events for a particular thread group. A plurality of threads for an application running in the computing environment to a plurality of thread groups are configured by a plurality of thread group fields in a plurality of control registers. A number of counter sets are allowed to count a number of thread group events originating from one of a shared resource and a shared cache are specified by a number of additional hypervisor register fields.

13 Claims, 7 Drawing Sheets

(56) References Cited

OTHER PUBLICATIONS

Office Action issued on Nov. 30, 2012 for U.S. Appl. No. 12/902,491, 17 pages.
Office Action issued on Jan. 16, 2013 for U.S. Appl. No. 12/900,667, 19 pages.
Treibig et al., "LIKWID: A lightweight performance-oriented tool suite for x86 multicore environments", 2010, Accepted for PSTI2010, the First International Workshop on Parallel Software Tools and Tool Infrastructures, San Diego CA, Sep. 13, 2010. arXiv:1004.4431, pp. 1-7.
Maxwell et al., "Accuracy of performance monitoring hardware", Proc. LACSI Symposium, Santa Fe NM, 2002, pp. 1-21.
Moore et al., "Thread Level Transactional Memory", Mar. 31, 2005, Technical Report 1524, Computer Sciences Dept., UW-Madison, pp. 1-11.
USPTO Final Office Action, U.S. Appl. No. 12/900,667, May 9, 2013, 6 pages.

PERFORMANCE MONITOR DESIGN FOR COUNTING EVENTS GENERATED BY THREAD GROUPS

BACKGROUND

1. Field

The disclosure relates generally to data processing and more specifically to counting events by thread groups in processors running a multitude of threads.

2. Description of Related Art

Chips may contain multiple processors and may be capable of handling a large number of threads. Typically, processor chips have built-in performance instrumentation that monitors various performance-related events occurring during operation of the chip.

Performance instrumentation consists of performance monitor units that provide counters, support for selecting and routing event signals to those counters, and registers to hold sampled instruction addresses. Performance monitor units may also interrupt one or more processors when a trigger condition is met. For example, interruption of a thread on a processor may be necessary when a counter overflows to support instruction sampling. An interrupt signal to the processor may be used to freeze a register that holds the address of an instruction that is executing at the time the trigger condition occurred, or that has recently completed execution. To support monitoring of performance events on all threads and processor cores, a performance monitor unit is provided per thread, or counters are shared among multiple threads or processor cores.

Per thread performance event counting is used to count events by thread. Counting on a per thread basis is required for instruction sampling. When there are many processor cores and threads in a chip, many counters are required to perform application-wide event counting. The larger amount of counters takes up a larger amount of space in the chip.

Per processor core performance event counting of events generated by a processor core may be performed without attributing the events to any thread or subset of threads. While per processor core performance events reduce the number of counters required, per processor core performance event counting cannot provide application wide counting because it is not possible to attribute events to a subset of threads when a processor core's threads are running a mix of threads for a mix of applications. Another category of events may count events generated by any thread. An example of counting events generated by any thread may be events occurring in shared resources that can be accessed by threads on multiple processor cores.

BRIEF SUMMARY

According to one embodiment of the present invention, a number of hypervisor register fields are set to specify which processor cores are allowed to generate a number of performance events for a particular thread group. A plurality of threads for an application running in a computing environment are configured into a plurality of thread groups by a plurality of thread group fields in a plurality of control registers. A number of counter sets that are allowed to count a number of thread group events originating from one of a shared resource and a shared cache are specified by a number of additional hypervisor register fields.

DETAILED DESCRIPTION

The illustrative embodiments recognize and take into account that thread groups may be created so that performance events belonging to a thread group can be counted, rather than counting on a per thread or per processor core basis or counting all occurrences of the event. The illustrative embodiments recognize and take into account that a method, system, and program product for performance monitoring in a computing environment with multiple processor cores may comprise configuring a plurality of software threads for an application running in the computing environment into a plurality of software thread groups by a plurality of thread group fields in a plurality of control registers, setting a number of hypervisor register fields to specify which processor cores are allowed to generate a number of performance events for a particular software thread group, and selecting a software thread group to be monitored by particular counter sets so that performance events belonging to the software thread group are counted only by the particular counter sets.

The illustrative embodiments recognize and take into account that counting performance events on a thread group basis may avoid a need to reserve one counter per thread per event to get application-wide performance event counts. The illustrative examples recognize and take into account that several performance events may be of primary interest on a per-application basis.

The illustrative embodiments recognize and take into account that compared to per thread and per processor core events, thread groups allow improved support for additional events in a performance monitor design, while avoiding an undesired increase in an area of hardware, such as multiplexer structures for controlling signals to counters.

The illustrative embodiments recognize and take into account that a reduction in thread migration time during performance monitoring may provide less interference to performance. When threads in an application move around or when a context of a thread is changed, a thread group may be re-defined by modifying one control register on each affected processor core. Redefining the thread group by modifying a control register on a processor core avoids saving and restoring potentially numerous counters used by an application's threads.

Figure 1:
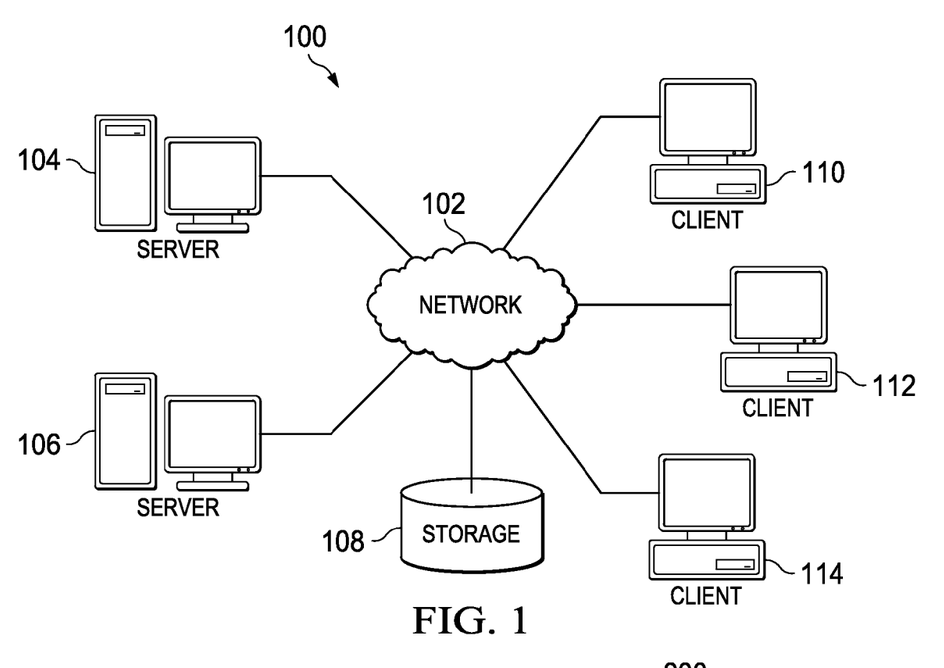
FIG. 1 is a pictorial representation of a network of data processing systems in which the illustrative embodiments may be implemented.

Referring to FIG. 1, a pictorial representation of a network of data processing systems is depicted in which illustrative embodiments may be implemented. Network data processing system 100 may be a network of computers in which the illustrative embodiments may be implemented. Network data processing system 100 contains network 102, which may be the medium used to provide communications links between various devices and computers operably coupled together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as an intranet, a local area network (LAN), or a wide area network (WAN). FIG. 1 is intended as an example, and not as an architectural limitation for the different illustrative embodiments.

Figure 2:
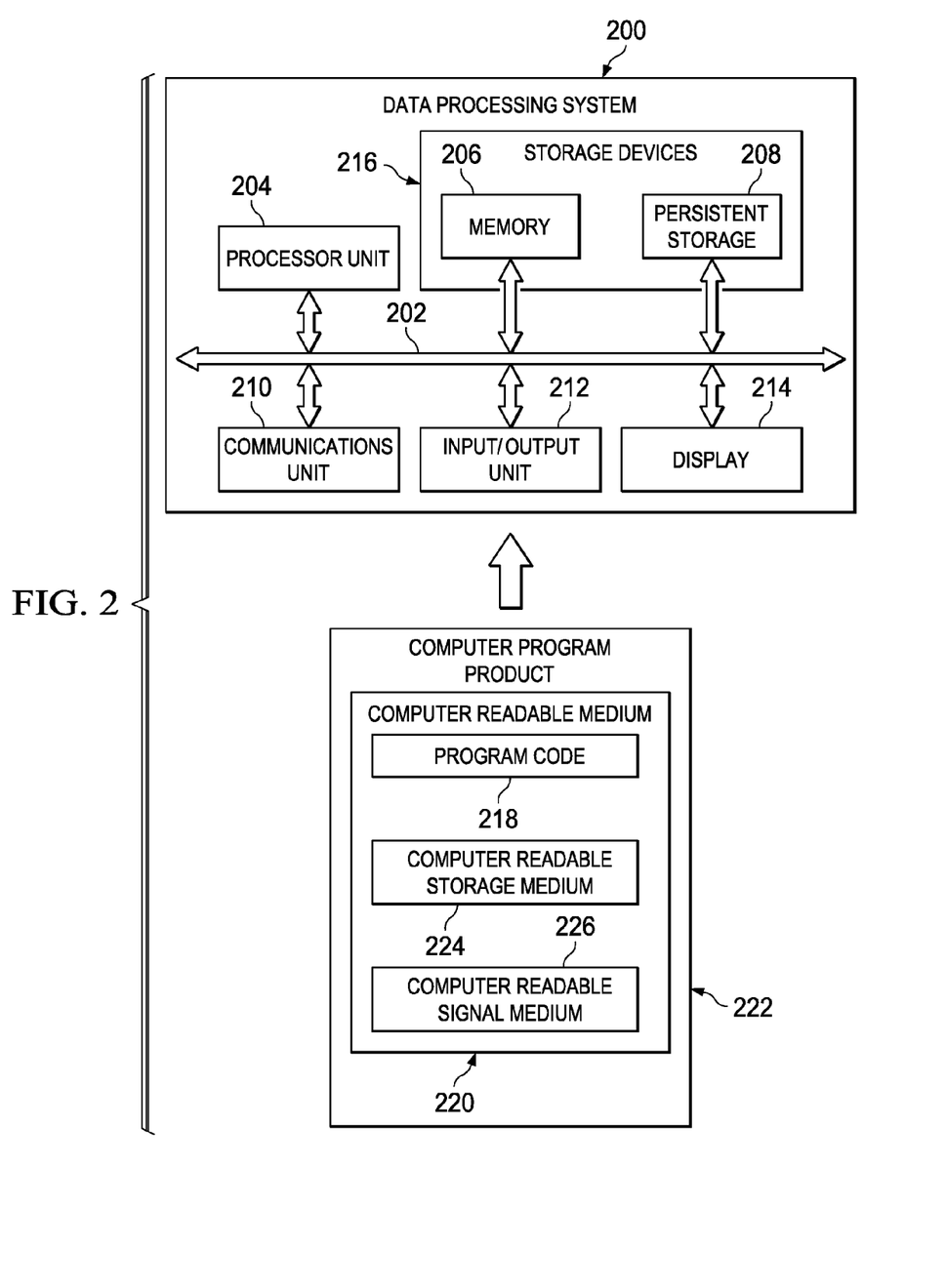
FIG. 2 is an illustration of a data processing system depicted in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to run instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor may be present with secondary processors on a single chip. As another illustrative example, processor unit 204 may be a symmetric multi-processor system containing multiple processors of the same type.

Memory 206 and persistent storage 208 are examples of storage devices 216. A storage device may be any piece of hardware that may be capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device, with power management features like support for various lower power states. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The medium used by persistent storage 208 also may be removable. For example, a removable hard drive may be used for persistent storage 208.

Communications unit 210, in these examples, provides for communications with other data processing systems or devices. In these examples, communications unit 210 may be a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer usable program code, or computer readable program code that may be read and run by a processor in processor unit 204. The program code in the different embodiments may be embodied on different physical or computer readable storage mediums, such as memory 206 or persistent storage 208.

Program code 218 may be located in a functional form on computer readable medium 220 that may be selectively removable and may be loaded onto or transferred to data processing system 200 for running by processor unit 204. Program code 218 and computer readable medium 220 form computer program product 222 in these examples. In one example, computer readable medium 220 may be computer readable storage medium 224 or computer readable signal medium 226. Computer readable storage medium 224 may include, for example, an optical or magnetic disk that may be inserted or placed into a drive or other device that may be part of persistent storage 208 for transfer onto a storage device, such as a hard drive, that may be part of persistent storage 208. Computer readable storage medium 224 also may take the form of a persistent storage, such as a hard drive, a thumb drive, or a flash memory, that may be connected to data processing system 200. In some instances, computer readable storage medium 224 may not be removable from data processing system 200. In these illustrative examples, computer readable storage medium 224 may be a non-transitory computer readable storage medium.

Alternatively, program code 218 may be transferred to data processing system 200 using computer readable signal medium 226. Computer readable signal medium 226 may be, for example, a propagated data signal containing program code 218. For example, computer readable signal medium 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal medium 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 may be any hardware apparatus that may store data. Memory 206, persistent storage 208, and computer readable medium 220 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
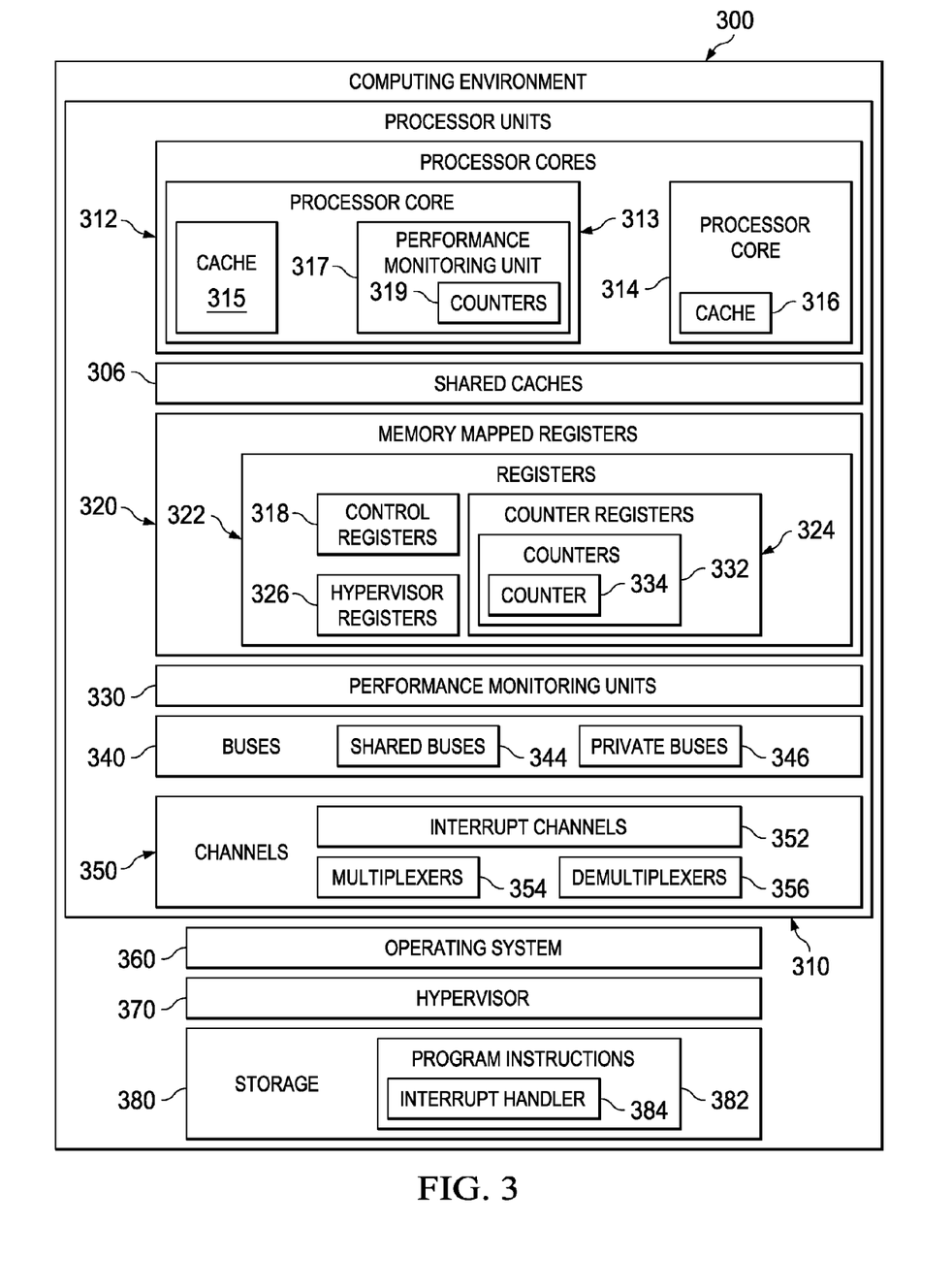
FIG. 3 is an illustration of a computing environment in which the illustrative embodiments may be implemented.

Turning to FIG. 3, an illustration of a computing environment is depicted in which the illustrative embodiments may be implemented. Computing environment 300 comprises processor units 310, operating system 360, hypervisor 370, and storage 380. Processor units 310 comprise shared caches 306, processor cores 312, memory mapped registers 320, performance monitoring units 330, buses 340, and channels 350. Processor cores 312 comprise a number of processors such as processor core 313 and processor core 314. Processor core 313 may comprise cache 315 and performance monitoring unit 317. Performance monitoring unit 317 may comprise counters 319. For processor cores such as processor core 313 having counters 319, counters 319 would be accessible only to processor core 313, and counters 319 may count events, including thread group events, generated within processor core 313. In such a case, a thread group may only span threads inside processor core 313.

Processor core 314 may further comprise cache 316. Memory mapped registers 320 may comprise registers 322. Registers 322 may comprise counter registers 324, hypervisor registers 326, and control registers 318. The illustrative embodiments recognize and take into account that other registers such as sampled instruction address registers, trigger status registers, and others may reside in memory mapped registers 320.

The illustrative examples recognize and take into account that system software may dynamically assign individual counters to hardware threads via special fields in counter registers such as counter registers 324. The illustrative embodiments recognize and take into account that the assignment of individual counters to hardware threads gives an appearance of per thread counters, whereas counters are shared dynamically. The illustrative embodiments recognize and take into account that performance events may be counted on a thread group basis so that performance events belonging to a thread group may be counted rather than counting on a per thread, a per processor core basis, or counting all occurrences of the events. Performance events may be counted on a thread group basis by setting up thread groups using control registers 318.

The illustrative embodiments recognize and take into account that for security, isolation support for partitioned environments may be specified in a hypervisor-controlled register such as a hypervisor register in hypervisor registers 326. The illustrative examples recognize and take into account that in a partitioned environment, isolation may be necessary due to visibility of a shared event bus carrying signals to count at counters belonging to processor cores in another partition. Furthermore, multiple partitions may simultaneously require a thread group and generate performance monitor events for the thread group. The illustrative examples recognize and take into account that when performance monitor events are generated for a shared resource, such as a shared cache level, arbitration may be required to allow only one partition to generate thread group events at a time. The illustrative embodiments recognize and take into account that control fields in the hypervisor registers such as hypervisor registers 326 may provide isolation by controls to block bits of a shared event bus in a number of shared event buses that are used for thread group events at each counter. In one illustrative example, shared event buses may originate in shared resources, such as shared cache 430 in FIG. 4. By selectively blocking shared event bus bits, a hypervisor such as hypervisor 370 may prevent thread group events for one partition from being counted in counters belonging to another partition.

The illustrative embodiments recognize and take into account that at least one counter is necessary for each thread that may be monitored simultaneously while running on processor cores 312. The illustrative embodiments recognize and take into account that special fields in control registers for each processor core may allow an operating system to dynamically specify a number of hardware threads as a thread group. The illustrative embodiments recognize and take into account that specifying thread groups may allow an analysis tool to select an application to be monitored by specifying the hardware threads on which the application is running, and then to follow the thread group around the computing system environment even when the application's threads are moved to other processor cores or hardware threads over time.

In an embodiment, performance monitoring unit 317 may comprise a number of counters such as may be in counters 319. The illustrative embodiments recognize and take into account that performance monitoring units such as performance monitoring unit 317 may provide counters such as counters 319 as well as support for selecting and routing event signals to counters 319 and to registers such as registers 322 via buses 340.

The illustrative embodiments recognize and take into account that counters in the performance monitoring unit, as in counters 319 in performance monitoring unit 317 may or may not be present as shown in FIG. 3. In response to counters such as counters 319 being present in performance monitoring unit 317, counters 319 may be accessible only to processor core 313 to which counters 319 are operably coupled, and may only count events, including thread group events, generated within processor core 313. In the case where counters such as counters 319 are present in the performance monitoring unit of a processor core such as performance monitoring unit 317, a thread group may only span those threads which are inside processor core 313.

The illustrative embodiments recognize and take into account that counters, such as counters 319 and counters 332, may contain a number of special fields and that the number of special fields may be configured to allow system software such as program instructions 382 in storage 380, instructions that are part of the operating system 360, or instructions that are part of hypervisor 370 to dynamically assign counters to a number of threads running on processor cores 312. Program instructions 382 may include interrupt handler 384.

The illustrative embodiments recognize and take into account that performance monitoring in a computing environment, such as computing environment 300, with multiple processor cores, such as processor cores 312, may be performed by configuring a plurality of threads for an application running in the computing environment into a plurality of thread groups by a thread group field at a control register, such as may be in control registers 318. The illustrative embodiments further recognize and take into account that each operating system, such as operating system 360, may perform a configuration of thread groups on the processor cores controlled by the operating system.

The illustrative embodiments further recognize and take into account that a hypervisor, such as hypervisor 370, may select a thread group to be monitored by a particular counter set so that performance events belonging to the thread group are counted only by the particular counter set.

The illustrative embodiments recognize and take into account that performance monitoring units, such as performance monitoring units 317 and 330, may provide an ability to monitor a number of performance-related events that occur during running of a number of threads through processor cores 312. The illustrative embodiments recognize and take into account that performance monitoring units, such as performance monitoring units 317 and 330, may be configured to interrupt processor cores 312 of processor units 310 when a condition is met. An illustrative condition may be when a counter overflows. The illustrative embodiments recognize that an interruption when a counter overflows may be necessary to support instruction sampling.

Buses 340 may comprise a number of buses such as shared buses 344 and private buses 346. Shared buses 344 may comprise a shared bus. Private buses 346 may comprise a private bus. Channels 350 may comprise a number of interrupt channels 352, a number of multiplexers 354, and a number of demultiplexers 356. A counter, such as counter 334 in counters 332 in counter registers 324, may be configured, upon occurrence of a condition, to set a bit in a trigger status register. A trigger status register may send a signal via a channel such as interrupt channels 352 and multiplexers 354 to a processor core such as processor core 313 or 314.

Operating system 360 may be any operating system configured for computing environment 300. Hypervisor 370 controls hypervisor registers 326. The illustrative embodiments recognize and take into account that a hypervisor, such as hypervisor 370, may ensure that, at a time, only one partition may generate a thread group event for a shared resource such as shared caches, by using fields in a hypervisor controlled register, such as hypervisor registers 326, to enable or disable generation of thread group events on a per processor core basis. Further, a hypervisor such as hypervisor 370 may use a register such as hypervisor registers 326, controlled by a hypervisor such as hypervisor 370, to enable counting of thread group events on only a particular a set of counters belonging to a particular partition. Within that partition, using a register such as control registers 318, an operating system such as operating system 360 has freedom to designate any combination of threads as belonging to a thread group.

Figure 4:
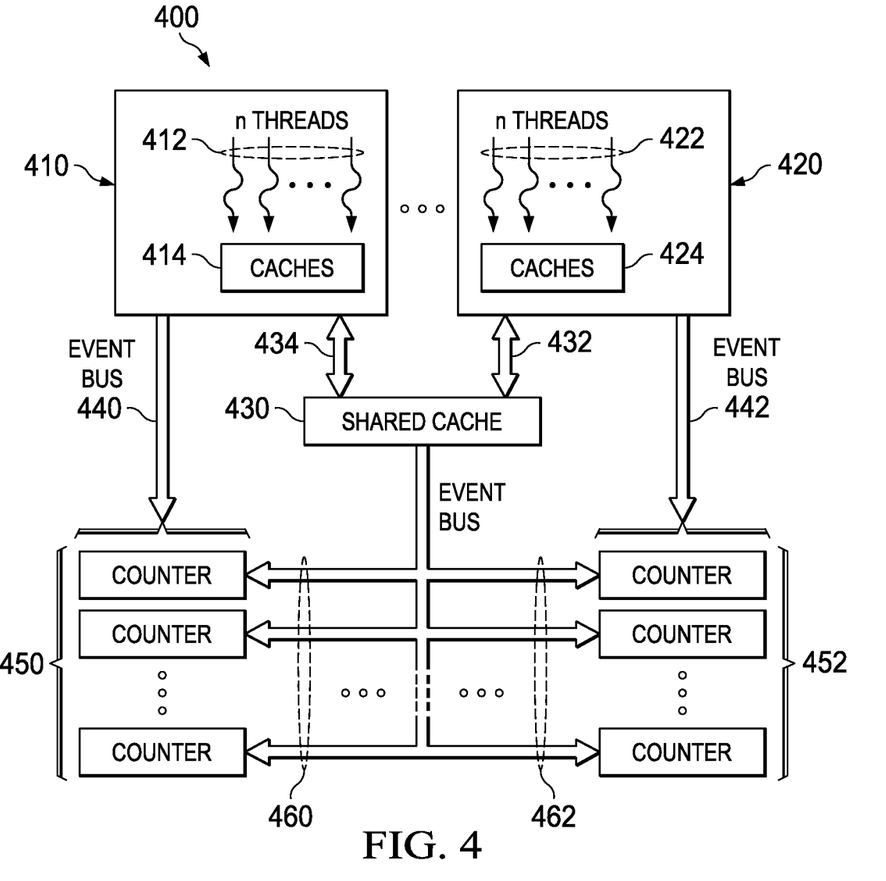
FIG. 4 is an illustration of a mechanism to regulate counting of thread group events at counters by a hypervisor register depicted in accordance with an illustrative embodiment.

The illustrative embodiments recognize and take into account that hypervisor 370 may ensure that at a time only one partition may generate thread group events for shared resources such as shared cache 430 in FIG. 4 by using fields in hypervisor registers 326 to enable or disable generation of thread group events on a per processor core basis and that hypervisor 370 may use hypervisor registers 326 to enable counting of thread group events on only a set of counters belonging to a particular partition. When a computing environment such as computing environment 300 does not have a hypervisor such as hypervisor 370, the functions of hypervisor 370's responsibilities may be performed by an operating system such as operating system 360 in FIG. 3.

Turning to FIG. 4, an illustration of a mechanism to regulate counting of thread group events at counters by a hypervisor register is depicted in accordance with an illustrative embodiment. First processor core 410 processes first threads 412 and contains first caches 414 and first event bus 440 so that first counter set 450 monitors first threads 412. Second processor core 420 processes second threads 422 and contains second caches 424 and second event bus 442 so that second counter set 452 monitors second threads 422. First event bus 440 and second event bus 442 may be private buses such as private buses 346 in FIG. 3. Shared cache 430 is operably coupled to first processor core 410 by third event bus 434 and to second processor core 420 by fourth event bus 432. Shared cache 430 is operably coupled to first gate 460 and to second gate 462 by fifth event bus 444. Third event bus 434 and fourth event bus 432 may also be a private bus such as one of private buses 346 in FIG. 3. Fifth event bus 444 may be a shared bus such as shared buses 344 in FIG. 3. Fifth event bus 444 is operably coupled to first counter set 450 by first gate 460 and to second counter set 452 by second gate 462. Propagation of event signals of first threads 412 and second threads 422 through first gate 460 and second gate 462 is controlled by a hypervisor register such as hypervisor registers 326 in FIG. 3. Counter sets such as counter sets 450 and 452 may be located inside a processor core or outside of a processor core. Counter sets may be shared by multiple processor cores.

When counter sets are shared by multiple cores, additional isolation measures may be required, such as zeroing out event signals that move across a partition boundary.

The illustrative embodiments recognize and take into account that when there are multiple processor cores in a chip, it is possible for each processor core to belong to a different partition. Security breaches may arise if the shared counters are outside the processor cores and are accessible by many processor cores. In such cases, groups of counters may be assigned to a separate page in a system memory map. By setting access control attributes in a memory management unit inside each processor core appropriately, processor cores can be restricted to accessing only counter sets that belong to the same partition as the processor core. In order to prevent bus signals from being visible at counters belonging to a different partition, control fields may be provided in a hypervisor register such as hypervisor registers 326 in FIG. 3 to zero out all signals that cross over from one partition to another and to enable counting of thread group events on only counter sets belonging to that particular partition.

Figure 5:
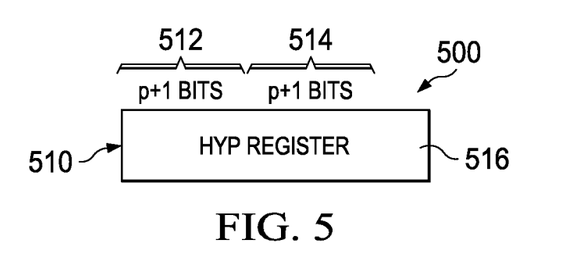
FIG. 5 is an illustrative example of a hypervisor control register depicted in accordance with an illustrative embodiment.

Turning to FIG. 5, an illustrative example of a hypervisor control register is depicted in accordance with an illustrative embodiment. Hypervisor register 500 is configured with a number of hypervisor registers such as first hypervisor register 510. First hypervisor register 510 has first field 512 and second field 514, wherein first field 512 specifies processor cores allowed to generate a thread group event, and second field 514 specifies a counter set allowed to count a thread group event originating from the computing environment. First field 512 may comprise p+1 bits where p+1 is the number of cores. Additional fields may exist in counter registers such as counter registers 324 in FIG. 3 or in additional control registers such as control registers 318 in FIG. 3 to provide other configuration and control functions. Other configuration and control functions may comprise freezing counters and triggering interrupts. Furthermore, additional fields may identify the thread and processor to which the counters are assigned. Hypervisor register 500 may allow a hypervisor such as hypervisor 370 in FIG. 3 to control which counter sets can count events on a shared bus such as a shared bus in shared buses 344 in FIG. 3. When counter sets are shared by multiple processor cores, second field 514 may be expanded to enable counting on a per counter basis in each counter set. In an embodiment, multiple hypervisor registers may be implemented.

Figure 6:
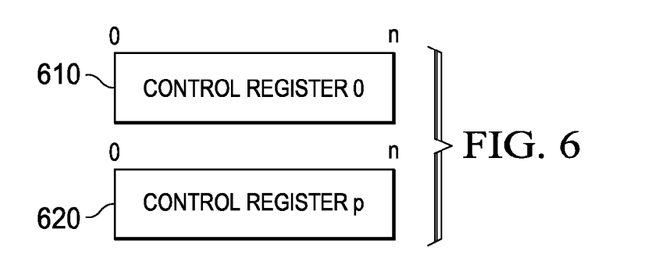
FIG. 6 is an illustrative example of a control register depicted in accordance with an illustrative embodiment.

Turning to FIG. 6, an illustrative example of a control register is depicted in accordance with an illustrative embodiment. First control register 610 and second control register 620 are depicted to represent control registers 0 through p. Control registers, such as control registers 610 and control register 620, may be control registers such as control registers 318 in FIG. 3. Control registers such as control registers 610, 620, and 318 in FIG. 3 may allow an operating system such as operating system 360 in a computing environment such as computing environment 300 in FIG. 3 to specify which threads in a corresponding processor core, such as processor core 314 in FIG. 3, are in a particular thread group. Such a specification by an operating system such as operating system 360 in FIG. 3 may only be effective when a hypervisor controlled register, such as a hypervisor register in hypervisor registers 326 in FIG. 3, has allowed that processor core to generate thread group events in a field such as first field 512 of hypervisor register 500 in FIG. 5. First control register 610 and second control register 620 may allow control registers for an operating system such as operating system 360 in FIG. 3 to specify threads in a number of corresponding processor cores owned by the operating system to be part of a thread group when hypervisor such as hypervisor 370 in FIG. 3 has allowed the corresponding processor cores to generate thread group events. The logic of performance event generation in performance monitoring units may generate thread group events only for threads that are part of an active thread group.

Figure 7:
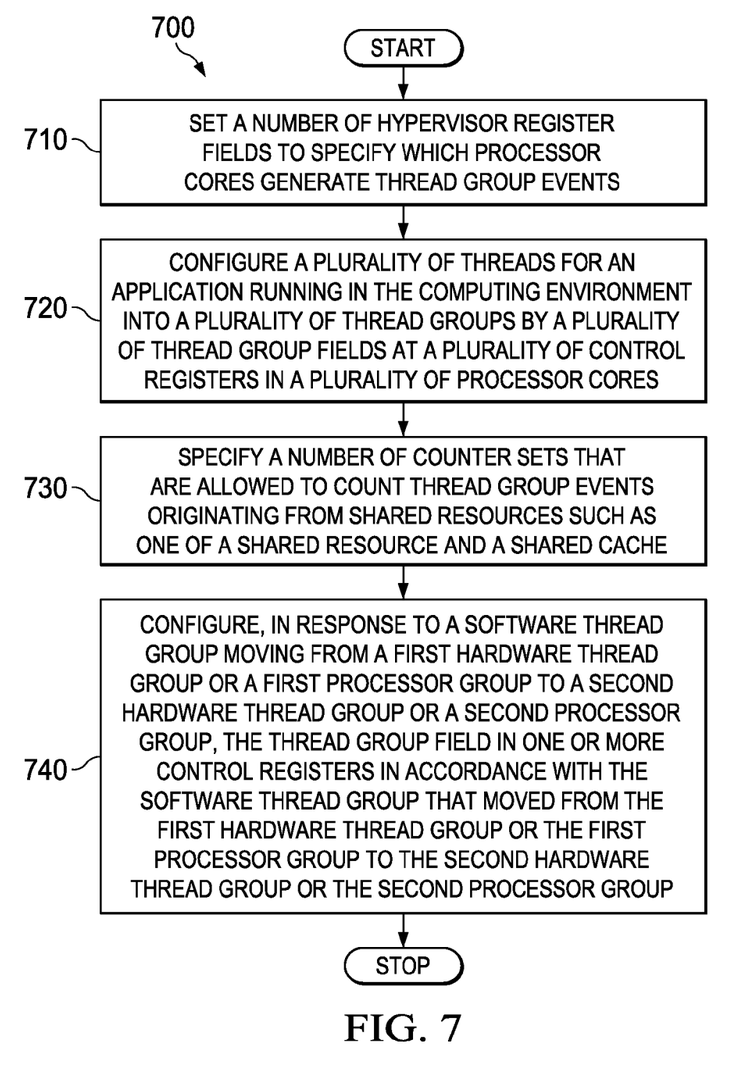
FIG. 7 is a flowchart of a process for creating a plurality of thread groups depicted in accordance with an illustrative embodiment.

Turning to FIG. 7, a flowchart of a process for creating a plurality of thread groups is depicted in accordance with an illustrative embodiment. Process 700 starts and sets a number of hypervisor register fields to specify which processor cores generate thread group events (step 710). The hypervisor register fields may be in hypervisor registers 326 in FIG. 3. Process 700 configures a plurality of threads for an application running in the computing environment into a plurality of thread groups by a plurality of thread group fields at a plurality of control registers in a plurality of processor cores (step 720). The plurality of control registers may be control registers 318 in FIG. 3. In an embodiment, the plurality of control registers may be first control register 610 and second control register 620 in FIG. 6. Process 700 specifies a number of counter sets that are allowed to count thread group events originating from one of a number of shared resources and a number of shared caches (step 730). The illustrative embodiments recognize and take into account that the number of counter sets that are allowed to count a number of thread group events originating from one of a shared resource and a shared cache may be specified by a number of additional hypervisor register fields.

Process 700 configures, in response to a software thread group moving from a first hardware thread group or a first processor group to a second hardware thread group or a second processor group, the thread group field in one or more control registers in accordance with the software thread group that moved from the first hardware thread group or the first processor group to the second hardware thread group or the second processor group (step 740). Process 700 terminates thereafter.

The illustrative embodiments recognize and take into account that performance events generated by threads in thread groups may be counted by any number of counter sets, so long as the hypervisor register field is configured to allow counting by the counter set. The illustrative embodiments recognize and take into account that those counter sets that are allowed to count by a corresponding field in the hypervisor register may belong to the same logical partition.

Figure 8:
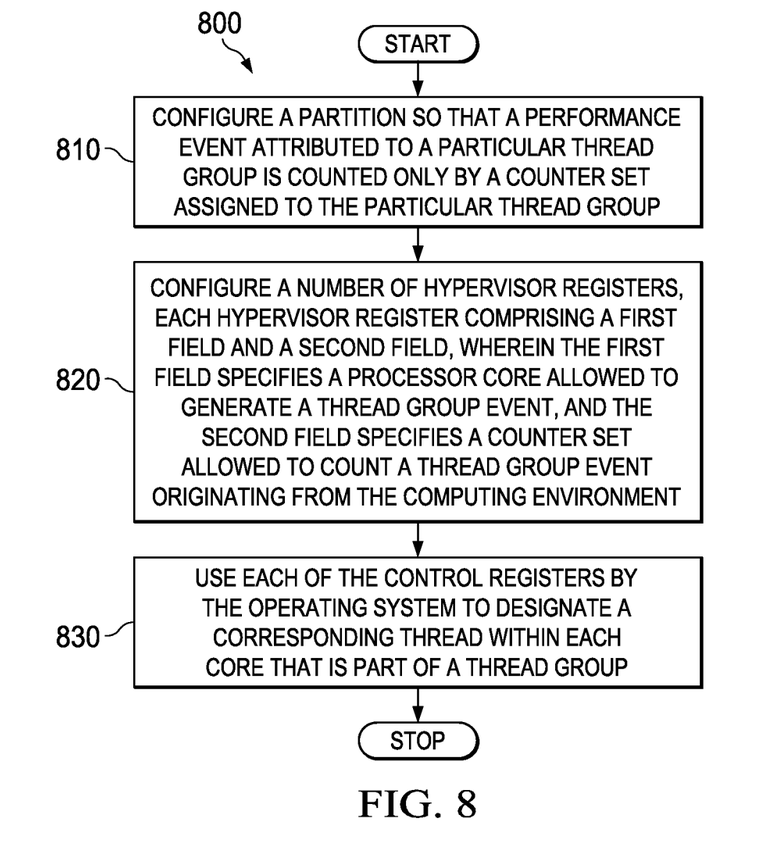
FIG. 8 is a flowchart for a process for partitioning counter sets in a computing environment having a plurality of processor cores depicted in accordance with an illustrative embodiment.

Turning to FIG. 8, a flowchart of a process for partitioning counter sets in a computing environment having a plurality of processor cores is depicted in accordance with an illustrative embodiment. Process 800 starts by configuring a partition so that a performance event attributed to a particular thread group is counted only by a counter set assigned to the particular thread group (step 810). The counter sets may be first counter set 450 and second counter set 452 in FIG. 4. In an embodiment, the counter sets may be formed from counters 332 in counter registers 324 in FIG. 3. Process 800 configures a number of hypervisor registers, each hypervisor register comprising a first field and a second field, wherein the first field specifies a processor core allowed to generate a thread group event, and the second field specifies a counter set allowed to count a thread group event originating from the computing environment (step 820). The number of hypervisor registers may be hypervisor registers 326 in FIG. 3. In an embodiment, a hypervisor register may be hypervisor register 500 in FIG. 5. In an embodiment, the first field may be first field 512 and the second field may be second field 514 in FIG. 5. Process 800 uses each of the control registers by the operating system to designate a corresponding thread within each core that is part of a thread group (step 830). The control registers may be control registers 318 and the operating system may be operating system 360 in FIG. 3. Process 800 terminates thereafter.

Figure 9:
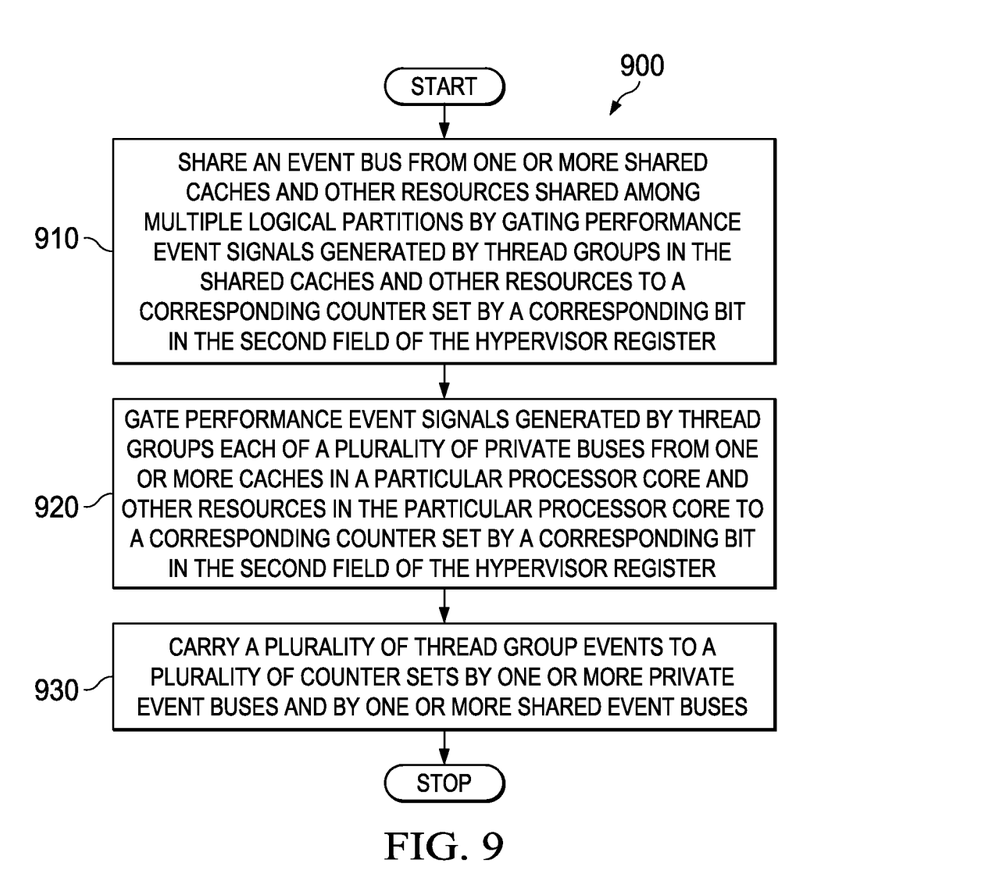
FIG. 9 is a flowchart of a process for sharing an event bus depicted in accordance with an illustrative embodiment.

Turning to FIG. 9, a flowchart of a process for sharing an event bus is depicted in accordance with an illustrative embodiment. Process 900 starts by sharing an event bus from one or more shared caches and other resources shared among multiple logical partitions by gating performance event signals generated by thread groups in the shared caches and other resources to a corresponding counter set by a corresponding bit in the second field of the hypervisor register (step 910). The one or more shared caches maybe shared caches 430 in FIG. 4 and the event bus may be a shared event bus such as shared buses 344 in FIG. 3. Process 900 gates performance event signals generated by thread groups on each of a plurality of private buses from one or more caches in a particular processor core and other resources in the particular processor core to a corresponding counter set by a corresponding bit in the second field of the hypervisor register (step 920). The plurality of private buses may be private buses 346 in FIG. 3. Gates may be first gate 460 and second gate 462 in FIG. 4. Process 900 carries a plurality of thread group events to a plurality of counter sets by one or more private event buses and by one or more shared event buses (step 930). Process 900 terminates thereafter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein; for example, in baseband or as part of a carrier wave. Such a propagated signal may take any of a variety of forms including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied in a computer readable signal medium may be transmitted using any appropriate medium including, but not limited to, wireless, wire line, optical fiber cable, RF, etc., or any suitable combination of the foregoing.

Computer program code for carrying out operations of the present invention may be written in any combination of one or more programming languages, including an object oriented programming language such as Java™, Smalltalk, C++ or the like, and conventional procedural programming languages, such as the "C" programming language or similar programming languages. (Java and all Java-based trademarks and logos are trademarks of Sun Microsystems, Inc., in the United States, other countries or both.) The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus, systems and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks. The computer program instructions may also be loaded onto a computer or other programmable data processing apparatus to cause a series of operational steps to be performed in the computer or other programmable apparatus to produce a computer-implemented process, such that the instructions that execute in the computer or other programmable apparatus provide processes for implementing the functions/acts specified in the flowchart and/or block diagram block or blocks. Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments with various modifications as are suited to the particular use contemplated.

Aspects of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   setting a number of hypervisor register fields to specify which processor cores are allowed to generate a number of performance events for a particular thread group;
   configuring a plurality of software threads for an application running in the computing environment into a plurality of thread groups by a plurality of thread group fields in a plurality of control registers;
   specifying, by a number of additional hypervisor register fields, a number of counter sets that are allowed to count a number of thread group events originating from one of a shared resource and a shared cache;
   configuring a partition so that a performance event attributed to a particular software thread group is counted only by a counter set assigned to the particular thread group; and
   configuring a number of hypervisor registers, each hypervisor register comprising a first field and a second field, wherein the first field specifies a processor core allowed to generate a performance event for a thread group, and the second field specifies a counter set allowed to count the performance event of the thread group, wherein the performance event originates from the computing environment.

2. The method of claim 1 further comprising:
   configuring, responsive to a software thread group moving from a first hardware thread group or a first processor group to a second hardware thread group or a second processor group, a thread group field in a control register in accordance with the software thread group that moved from the first hardware thread group or the first processor group to the second hardware thread group or the second processor group.

3. The method of claim 1 further comprising:
   using each of the control registers by the operating system to designate a corresponding thread within each processor core that is part of a thread group.

4. The method of claim 3 further comprising:
   sharing an event bus from one or more shared caches and other resources shared among multiple logical partitions by gating performance event signals generated by thread groups in the shared caches and other resources to a corresponding counter set by a corresponding bit in the second field of the hypervisor register; and
   gating a number of performance event signals generated by thread groups on each of a plurality of private buses from one or more caches in a particular processor core and other resources in the particular processor core to a corresponding counter set by a corresponding bit in the second field of the hypervisor register.

5. The method of claim 4 further comprising:
   carrying a plurality of performance events of a thread group to a plurality of counter sets by one or more private event buses and by one or more shared event buses.

6. A system comprising:
- a plurality of processor cores operably coupled to a plurality of counter registers;
- a plurality of performance counters operably coupled to a hypervisor register for gating a number of signals of thread group performance events at a set of the performance counters;
- a processor operably coupled to a computer readable memory and to a computer readable storage medium;
- a plurality of instructions embodied in the computer readable storage medium configured to execute, via the computer readable memory, on the processor to perform actions comprising:
  - setting a number of hypervisor register fields to specify which processor cores are allowed to generate a number of performance events for a particular thread group;
  - configuring a plurality of threads for an application running in the computing environment into a plurality of thread groups by a plurality of thread group fields in a plurality of control registers;
  - specifying, by a number of additional hypervisor register fields, a number of counter sets that are allowed to count a number of thread group events originating from one of a shared resource and a shared cache;
  - configuring a partition so that a performance event attributed to a particular thread group is counted only by a counter set assigned to the particular thread group; and
  - configuring a number of hypervisor registers, each hypervisor register comprising a first field and a second field, wherein the first field specifies a processor core allowed to generate a performance event for a thread group, and the second field specifies a counter set allowed to count the performance event of the thread group, wherein the performance event originates from the computing environment.

7. The system of claim 6, wherein the plurality of instructions further comprises:
- configuring, in response to a thread group moving from a first hardware thread group or a first processor group to a second hardware thread group or a second processor group, a thread group field in a control register in accordance with the thread group that moved from the first hardware thread group or the first processor group to the second hardware thread group or the second processor group.

8. The system of claim 6, wherein the plurality of instructions further comprises:
- using each of the control registers to designate a corresponding thread within each processor core that is part of a thread group.

9. The system of claim 8, wherein the plurality of instructions further comprise:
- sharing an event bus from one or more shared caches and other resources shared among multiple logical partitions by gating performance event signals generated by thread groups in the shared caches and other resources to a corresponding counter set by a corresponding bit in the second field of the hypervisor register; and
- gating performance event signals generated by thread groups on each of a plurality of private buses from one or more caches in a particular processor core and other resources in the particular processor core to a corresponding counter set by a corresponding bit in the second field of the hypervisor register.

10. A computer program product comprising:
- a non-transitory computer-readable storage medium having computer readable program code embodied therewith, the computer readable program code comprising:
  - computer program code configured to configure a plurality of threads for an application running in the computing environment into a plurality of thread groups by a plurality of thread group fields in a plurality of control registers;
  - computer program code configured to set a number of hypervisor register fields to specify which processor cores are allowed to generate a number of performance events for a particular thread group;
  - computer program code configured to specify, by a number of additional hypervisor register fields, a number of counter sets that are allowed to count thread group events originating from shared resources such as shared caches;
  - computer program code configured to configure a partition so that a performance event attributed to a particular thread group is counted only by a counter set assigned to the particular thread group; and
  - computer program code configured to configure a number of hypervisor registers, each hypervisor register comprising a first field and a second field, wherein the first field specifies a processor core allowed to generate a performance event for a thread group and the second field specifies a counter set allowed to count the performance event of the thread group, wherein the performance event originates from the computing environment.

11. The computer program product of claim 10 further comprising:
- computer program code configured to configure, in response to a thread group moving from a first hardware thread group or a first processor group to a second hardware thread group or a second processor group, a thread group field in a control register in accordance with the thread group that moved from the first hardware thread group or the first processor group to the second hardware thread group or the second processor group.

12. The computer program product of 11 further comprising:
- computer program code configured to use each of the control registers to designate a corresponding thread within each processor core that is part of a thread group.

13. The computer program product of claim 12 further comprising:
- computer program code configured to share an event bus from one or more shared caches and other resources shared among multiple logical partitions by gating performance event signals generated by thread groups in the shared caches and other resources to a corresponding counter set by a corresponding bit in the second field of the hypervisor register; and
- computer program code configured to gate performance event signals generated by thread groups on each of a plurality of private buses from one or more caches in a particular processor core and other resources in the particular processor core to a corresponding counter set by a corresponding bit in the second field of the hypervisor register.

* * * * *